UNITED STATES PATENT OFFICE.

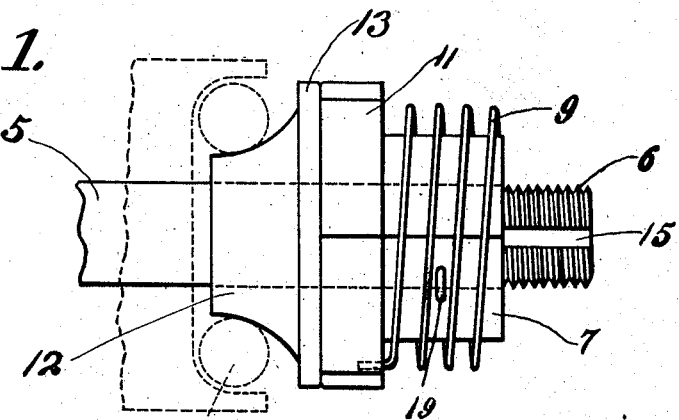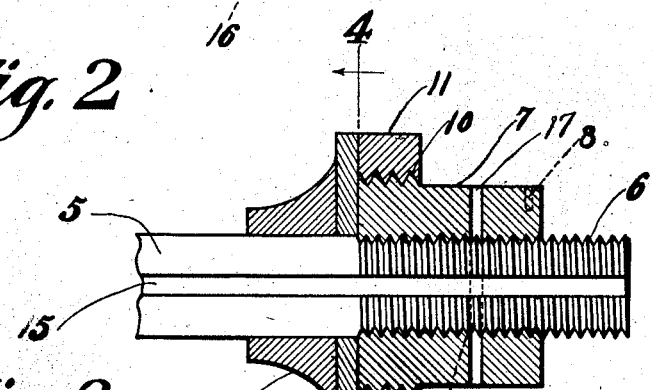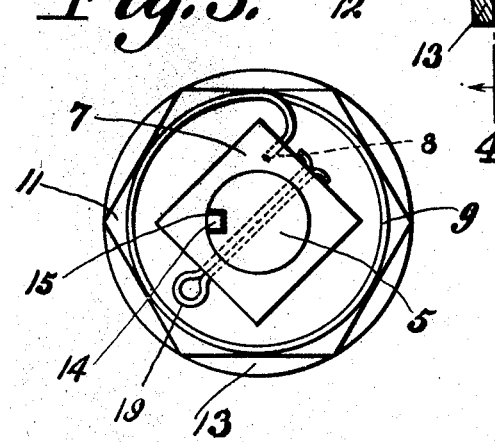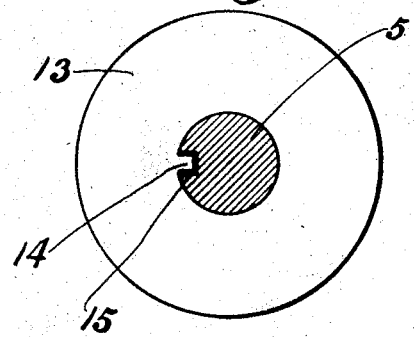

SAMUEL GNAGY, OF STRASBURG, OHIO.

COMPENSATING BEARING.

1,377,123.  Specification of Letters Patent.  Patented May 3, 1921.

Application filed June 4, 1920. Serial No. 386,457.

*To all whom it may concern:*

Be it known that I, SAMUEL GNAGY, a citizen of the United States, residing at Strasburg, in the county of Tuscarawas and State of Ohio, have invented a new and useful Compensating Bearing, of which the following is a specification.

The present invention relates to bearings, and more particularly to that type of bearing known as the cone bearing, commonly employed in connection with ball and roller bearings.

The primary object of the invention is to provide a cone bearing having means for automatically adjusting the same longitudinally of the shaft on which the bearing is supported, so that the balls or rollers associated therewith, will have a free but true seating on the bearing.

A further object of the invention is the provision of spring means having connection with the bearing proper, the spring means being especially designed to cause a rotation of the bearing, associated therewith, the rotation of the bearing being sufficient to cause the bearing to move longitudinally of its shaft.

With the foregoing and other objects in view which will appear as the description proceeds, the invention resides in the combination and arrangement of parts and in details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a side elevational view of a cone bearing, having the adjusting means applied thereto, the balls associated therewith being shown in dotted lines.

Fig. 2 illustrates a longitudinal sectional view through a bearing.

Fig. 3 illustrates an end elevational view of the same.

Fig. 4 illustrates a sectional view taken approximately on the line 4—4 of Fig. 2.

Referring to the drawing in detail, the supporting shaft, which may be employed for supporting wheels or the like, is indicated by the reference character 5, and is provided with the usual threaded extremity 6 by means of which the usual bearings are secured thereon.

Supported on the shaft 5, and coöperating with the threaded portion 6 thereof, is the main or supporting nut 7, that is provided with the opening 8 in one of the side faces thereof, which opening is adapted to receive one extremity of the coiled spring 9, to be hereinafter more fully describd.

This nut 7, is also provided with exterior threads 10, which threads are preferably formed with a decided pitch to cause the nut 11, which is carried thereby, to respond freely to the movements of the coiled spring 9, which as shown, has one end thereof disposed in a suitable opening provided in one of the side faces of the nut 11.

From the foregoing it is obvious that the construction of the coiled spring 9, which encircles the nut 7, is such as will cause a pressure to be exerted on the nut 11, to cause a slight rotation thereof, resulting in moving the bearing proper indicated by the reference character 12, longitudinally of its shaft to compensate for the lost motion caused by wear.

Contacting with one of the side faces of the nut 11, is an adjusting washer 13 which is permitted to move longitudinally of the shaft 5, but prevented from rotary movement thereon, by means of the tongue 14, formed integral therewith, and extending inwardly from the wall of the central opening. The tongue 14, in operation, is disposed in the groove 15 formed in one of the surfaces of the shaft 5, and extending from one end thereof, terminating a predetermined distance from the end.

The bearing 12 is of a particular construction, being such as will revolve on the shaft 5, to the end that the surface on which the balls 16 operate, is constantly changing, thereby distributing the wear directed to the bearing 12 through a greater portion of the surface thereof.

In order that the nut 7 will be maintained in a stationary position, with relation to the shaft 5, an opening 17 is provided in the nut, which opening is adapted to register with the opening 18 provided in the shaft 5, the registering opening being designed to accommodate the cotter pin 19.

From the foregoing it is obvious that the tension of the spring is such as will rotate the nut 11, in the event that the bearing becomes worn.

In the operation of the device, assuming that the balls 16 have caused the bearing 12 to wear so that the bearing 12 is no longer properly contacting with the balls 16, it is obvious that the coiled spring 9 which tends to rotate the nut 11, will cause the washer 13 to be moved slightly, to the end that the bearing 12, is also moved to take up the space caused between the bearing and balls 16.

What is claimed as new is:—

1. In a compensating bearing, a supporting shaft having a threaded portion, a nut disposed on the threaded portion, and provided with exterior threads, a nut disposed on the threaded portion of the first mentioned nut, a washer contacting with one of the surfaces of the last mentioned nut, a bearing member associated with the washer and adapted to be moved longitudinally of the shaft, means for preventing rotary movement of the washer, and means for automatically rotating the second mentioned nut.

2. In a compensating bearing, a supporting shaft having a threaded portion, a nut operating on the threaded portion, a washer disposed at one end of the nut, a bearing having one of its surfaces contacting with the washer, a nut operating on the first mentioned nut, and a coiled spring having connection with the nuts, for causing one of the nuts to rotate on the shaft for moving the bearing longitudinally of the shaft.

3. In a conpensating bearing, a supporting shaft having a threaded portion, a nut operated on the threaded portion, said nut being provided with exterior threads, an adjusting nut operating on the threaded portion of the first mentioned nut, a washer on the shaft, and a bearing contacting with the washer, a coiled spring having one end thereof secured to the first mentioned nut, the opposite end of said spring being secured to the adjusting nut, and said spring adapted to exert a tension on the adjusting nut circumferentially of the shaft.

4. In a compensating bearing, a supporting shaft having a threaded portion, and having a groove formed in one surface thereof, a nut operating on the threaded portion, a shaft, an adjusting nut carried by the first mentioned nut, a washer contacting with the adjusting nut, said washer having a tongue positioned in the groove of the shaft, to prevent rotary movement of the washer, a bearing member on the shaft and contacting with the washer, and spring means carried by the nuts to cause the bearing member to move longitudinally of its shaft.

5. In a compensating bearing, a supporting shaft having a threaded portion, a nut supported on the threaded portion, an adjusting nut on the first mentioned nut, a washer contacting with the adjusting nut, a bearing member disposed on the shaft and adapted to revolve thereon, a coiled spring embracing the first mentioned nut, and having its ends connected to the nuts to cause rotary movement of one of the nuts, and means for preventing rotary movement of the washer.

In testimony that I claim the foregoing as my own, I have hereto affixed my signature in the presence of two witnesses.

SAMUEL GNAGY.

Witnesses:
 GEO. SUNTHEIMER,
 CHARLES L. CORELL.